(12) United States Patent
Ryu et al.

(10) Patent No.: US 12,504,766 B2
(45) Date of Patent: Dec. 23, 2025

(54) ELECTRONIC DEVICE AND CONTROL METHOD THEREOF

(71) Applicants: Hyundai Motor Company, Seoul (KR); Kia Corporation, Seoul (KR)

(72) Inventors: Jung Min Ryu, Hwaseong-si (KR); Jin Woo Kim, Seoul (KR); Yun Jae Kim, Seongnam-si (KR); Seok Won Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 81 days.

(21) Appl. No.: 18/606,162

(22) Filed: Mar. 15, 2024

(65) Prior Publication Data
US 2025/0189971 A1    Jun. 12, 2025

(30) Foreign Application Priority Data
Dec. 12, 2023   (KR) .................. 10-2023-0180166

(51) Int. Cl.
G05D 1/246   (2024.01)
G05D 1/646   (2024.01)

(52) U.S. Cl.
CPC ............. G05D 1/246 (2024.01); G05D 1/646 (2024.01)

(58) Field of Classification Search
CPC ........ G05D 1/692; G05D 1/693; G05D 1/6987
See application file for complete search history.

(56) References Cited

U.S. PATENT DOCUMENTS

| 9,069,354 | B2 | 6/2015 | Ryu et al. |
| 9,606,543 | B2 | 3/2017 | Jeon et al. |
| 2017/0325647 | A1 | 11/2017 | Kwak |

FOREIGN PATENT DOCUMENTS

| KR | 20140012358 A | 2/2014 |
| KR | 20150061398 A | 6/2015 |
| KR | 20190134869 A | 12/2019 |
| KR | 102247110 B1 | 5/2021 |

*Primary Examiner* — Mathew Franklin Gordon
(74) *Attorney, Agent, or Firm* — Slater Matsil, LLP

(57) ABSTRACT

An electronic device can include a memory and at least one processor. The at least one processor can identify a first main path generated at a first time point prior to a second time point when a target map including a map area for a position of a robot and a point group including points set on the target map are received and obtained by connecting the set points with each other, determine a type of a first sub-map and/or a second sub-map, apply the first sub-map and the second sub-map to a path planning model trained to obtain a first sub-path of the first sub-map and a second sub-path of the second sub-map, and connect the first sub-path and the second sub-path to generate a second main path in which the set points are connected.

20 Claims, 12 Drawing Sheets

| SUB-MAP | PATH LENGTH OF SUB-PATH | TIME REQUIRED | COST |
|---|---|---|---|
| A* | 39 | 25 | 46 |
| BestFirstSearch | 124 | 37 | 56 |
| JumpPointSearch | 85 | -1 | 90 |
| Dijkstra | 93 | 51 | 28 |
| RRT | 50 | 47 | 69 |
| User_custom_01 | 200 | 79 | 80 |

FIG.6

| ALGORITHM | NAME | OPTION | SETTING |
|---|---|---|---|
| 1 | Dijkstra_01 | {diagonal : true,} | false |
| 2 | Dijkstra_02 | { } | false |
| 3 | A_01 | {heuristic: manhattan, diagonal: true} | false |
| 4 | User_custom_01 | | true |
| 5 | User_custom_02 | | true |
| 6 | JPS | {heuristic: octile} | false |
| 7 | RRT | | false |
| ...15 | Bellman-Ford | {heuristic: manhattan, diagonal:true} | false |
| 16 | BFS_01 | {heuristic: Educlidean, diagonal:true} | false |
| 17 | BFS_02 | | false |

| ID | SUB-MAP | TYPE | TIME REQUIRED | ALGORITHM | SCORE | SIMILARITY |
|----|---------|------|---------------|-----------|---------|------------|
| 2  | P3-1    | 5    | 15s           | 3         | 0.03204 | 34         |
| 3  | P3-2    | 3    | 2.5s          | 7         | 0.483   | 72.2       |
| 4  | P3-3    | 3    | 5s            | 3         | 0.52    | 69         |
| 5  | P3-4    | 2    | 0.28s         | 1         | 0.079   | 81         |
| 6  | P3-5    | 4    | 3.6s          | 7         | 0.094   | 54         |

FIG.8

| TYPE | key | DESCRIPTION | ALGORITHM | SETTING | map_file_path |
|---|---|---|---|---|---|
| 1 | miro_01 | MAZE | 1,2 | true | /sensormap/sample/miro_01 |
| 2 | hallway_01 | HALLWAY | 3,1 | true | /sensormap/sample/hallway_01 |
| 3 | building_interior_01 | BUILDING_INTERIOR | 6 | true | /sensormap/sample/building_interior_01 |
| 4 | hotel_lobby_01 | HOTEL_LOBBY | 6 | true | /sensormap/sample/hotel_lobby_01 |
| 5 | apartment_interior_01 | APARTMENT_INTERIOR | 4 | true | /sensormap/sample/apartment_interior_01 |
| 6 | apartment_hall_01 | APARTMENT_FOYER | 6 | true | /sensormap/sample/apartment_hall_01 |
| 7 | broad_road_01 | EXTERIOR_MAIN ROAD | 16,1 | true | /sensormap/sample/broad_road_01 |
| 8 | side_road_01 | EXTERIOR_BACKSIDE ROAD | 3 | true | /sensormap/sample/side_road_01 |
| ... | ... | ... | ... | ... | ... |
| 19 | Auto_generated_01 | Auto_generated_01 | | false | /sensormap/generated/auto_generated_01 |
| 20 | Auto_generated_22 | Auto_generated_22 | 3 | false | /sensormap/generated/auto_generated_22 |

FIG. 9

| ID | DESCRIPTION | POINT | PATH |
|---|---|---|---|
| 1 | alleway 101, 1203 | {start_point: {x: 2,y: 9}, destination_point: {x: 491, y: 873} waypoint: [{x: 38,y: 99}, {x: 354,y: 519}]} | [{x: 2,y: 9}, {x: 2,y: 10}, {x: 3,y: 11}, ..., {x: 491,y: 873}] |
| 2 | alleway 101, 801 | ⋮ | ⋮ |
| 3 | alleway 401, 204 | ⋮ | ⋮ |
| 4 | alleway 201, 303 | ⋮ | ⋮ |
| 5 | alleway 101, 103 | ⋮ | ⋮ |
| 6 | alleway 301, 602 | ⋮ | ⋮ |

FIG. 10

ELECTRONIC DEVICE AND CONTROL METHOD THEREOF

CROSS-REFERENCE TO RELATED APPLICATIONS

This application claims the benefit of Korean Patent Application No. 10-2023-0180166, filed on Dec. 12, 2023, which application is hereby incorporated herein by reference.

TECHNICAL FIELD

The present disclosure relates to an electronic device and a control method thereof, for path planning for a robot.

BACKGROUND

When a robot internally performs path finding, the performance of hardware should be ensured. This necessarily leads to an increase in price of the robot, an increase in power consumption, and a decrease in operating time. The competitiveness of the robot may decrease. To address such problems, there is a need for path planning for robots.

SUMMARY

The present disclosure relates to an electronic device and a control method thereof, and more particularly, relates to technologies for applying a plurality of path planning models to a map to generate an optimal path.

The present disclosure has been made to solve the above-mentioned problems occurring in the prior art while advantages achieved by the prior art are maintained intact.

Some embodiments of the present disclosure can provide technology for applying a plurality of path planning models to a target map to generate an optimal path. Some embodiments of the present disclosure can provide technology for ensuring faster performance in path planning of a robot than path finding in the robot itself using a resource of a cloud. Some embodiments of the present disclosure can provide technology for segmenting a target map, which can be a high-capacity map, based on transit points to a sub-map to minimize a decrease in performance of path planning on the target map and evaluating the performance of the path planning model using a race model to group and collect results.

An embodiment of the present disclosure can provide an electronic device for identifying a first main path generated at a time point prior to a time point when a target map including a predetermined area with respect to a position of a robot and a point group including points set on the target map are received and obtained by connecting the set points with each other, based on receiving the target map and the point group, to obtain an effective result with low resource consumption by use of identification of a similar path for a path planning request and a control method thereof.

An embodiment of the present disclosure can provide an electronic device for applying a sub-map to at least one path planning model trained to calculate an optimal path on a map to obtain a sub-path of the sub-map, based on that a type of the sub-map is determined, to improve the performance of path planning and a control method thereof.

An embodiment of the present disclosure can provide an electronic device for inspecting whether transit points are included in a target map and whether each of the transit points is a point at which a robot is able to move to prevent an error due to an input error or mistake of a user and ensure safety and a control method thereof.

Technical problems to be solved by some embodiments of the present disclosure are not necessarily limited to the aforementioned problems, and solutions using an embodiment of the present disclosure to other technical problems not mentioned herein can be clearly understood from the following description by those skilled in the art to which the present disclosure pertains.

According to an embodiment of the present disclosure, an electronic device may include a memory storing computer-executable instructions and at least one processor that accesses the memory and executes the instructions. The at least one processor may identify a first main path generated at a time point prior to a time point when a target map including a predetermined area with respect to a position of a robot and a point group including points set on the target map are received and obtained by connecting the set points with each other, based on receiving the target map and the point group, may determine a type of at least one of a first sub-map or a second sub-map obtained by segmenting the target map on the basis of the points included in the point group, or any combination thereof, based on that the first main path is not identified, may apply the first sub-map and the second sub-map to a path planning model trained to calculate an optimal path on a map to obtain a first sub-path of the first sub-map and a second sub-path of the second sub-map, based on that at least one of the type of the first sub-map or the type of the second sub-map, or any combination thereof is determined, and may connect the first sub-path and the second sub-path to generate a second main path in which the set points are connected with each other.

In an embodiment, the at least one processor may identify a starting point, a destination, and a transit point included in the first main path, based on that the first main path is identified and may transmit the first main path to the robot, based on a difference between each of the starting point, the destination, and the transit point and each of the points included in the point group is included in a predetermined error distance.

In an embodiment, the at least one processor may identify transit points among the points included in the point group, may determine whether each of the transit points is a point at which the robot is able to move, based on the transit points are included in the target map, and may segment the target map on the basis of the points included in the point group, based on that each of the transit points is the point at which the robot is able to move.

In an embodiment, the at least one processor may obtain a first transit point included in the transit points, may obtain a second transit point different from the first transit point among points spaced apart from the first transit point at a predetermined distance, and may segment the target map on the basis of the first transit point and the second transit point to obtain the first sub-map and the second sub-map.

In an embodiment, the at least one processor may identify a center point of the first sub-map and a boundary point with the highest distance from the center point among points spaced apart from the center point on the first sub-map, may determine a sub-area including points spaced apart from the center point at a distance between the center point and the boundary point and a predetermined distance, and may determine the first sub-map as the sub-area.

In an embodiment, the at least one processor may identify a preset map for determining a type of at least one sub-map between the first sub-map and the second sub-map, from a database storing the first main path, and may perform type matching between the sub-map and the preset map to determine the type of the sub-map.

In an embodiment, the at least one processor may adjust the sub-map and the preset map to a predetermined size, may identify a first pixel of the sub-map and a second pixel at the same position as the first pixel on the preset map, and may perform the type matching, based on a difference between the first pixel and the second pixel.

In an embodiment, the at least one processor may determine a similarity between the sub-map and the preset map, based on performing the type matching, and may determine the type of the sub-map as a type of the preset map, based on that the similarity is greater than a predetermined similarity.

In an embodiment, the at least one processor may generate the type of the sub-map, based on that the similarity is not greater than the predetermined similarity, and may store the type of the sub-map in the database.

In an embodiment, the at least one processor may identify a first unit path planning model and a second unit path planning model in the path planning model, based on the path planning model includes one or more unit path planning models.

In an embodiment, the at least one processor may apply the first sub-map to the first unit path planning model to obtain a 1_1st sub-path and apply the first sub-map to the second unit path planning model to obtain a 1_2nd sub-path and may apply the second sub-map to the first unit path planning model to obtain a 2_1st sub-path and apply the second sub-map to the second unit path planning model to obtain a 2_2nd sub-path.

In an embodiment, the at least one processor may obtain a first time required, including an interval between a time point when the first sub-map is applied to the first unit path planning model and a time point when the 1_1st sub-path is obtained, may obtain a first cost, based on usage of the processor and usage of the memory during the first time required, may obtain a second time required, including an interval between a time point when the first sub-map is applied to the second unit path planning model and a time point when the 1_2nd sub-path is obtained, and may obtain a second cost, based on usage of the processor and usage of the memory during the second time required.

In an embodiment, the at least one processor may apply a predetermined weight group to each of the first time required, the first cost, and a length of the first sub-path to determine a first score, may apply the weight group to each of the second time required, the second cost, and a length of the second sub-path to determine a second score, and may obtain the first sub-path, based on comparing the first score with the second score.

In an embodiment, the at least one processor may include a first processor, a second processor, and a target processor. The first processor may apply the first sub-map to the first unit path planning model to obtain the 1_1st sub-path. The second processor may apply the first sub-map to the second unit path planning model to obtain a 1_2nd sub-path. The target processor may asynchronously perform an operation of the first processor and an operation of the second processor.

In an embodiment, the at least one processor may provide a user who uses the robot with data about the first unit path planning model and the second unit path planning model and may apply the first sub-map and the second sub-map to a unit path planning model selected by the user, based on receiving a selection of at least one of the first unit path planning model or the second unit path planning model from the user.

According to an embodiment of the present disclosure, a control method may include identifying a first main path generated at a time point prior to a time point when a target map including a predetermined area with respect to a position of a robot and a point group including points set on the target map are received and obtained by connecting the set points with each other, based on receiving the target map and the point group, determining a type of at least one of a first sub-map, a second sub-map obtained by segmenting the target map on the basis of the points included in the point group, or any combination thereof, based on that the first main path is not identified, applying the first sub-map and the second sub-map to a path planning model trained to calculate an optimal path on a map to obtain a first sub-path of the first sub-map and a second sub-path of the second sub-map, based on that at least one of the type of the first sub-map, the type of the second sub-map, or any combination thereof is determined, and connecting the first sub-path and the second sub-path to generate a second main path in which the set points are connected with each other.

In an embodiment, the identifying of the first main path may include identifying a starting point, a destination, and a transit point included in the first main path, based on that the first main path is identified, and transmitting the first main path to the robot, based on a difference between each of the starting point, the destination, and the transit point and each of the points included in the point group is included in a predetermined error distance.

In an embodiment, the control method may further include identifying transit points among the points included in the point group, determining whether each of the transit points is a point at which the robot is able to move, based on the transit points are included in the target map, and segmenting the target map on the basis of the points included in the point group, based on that each of the transit points is the point at which the robot is able to move.

In an embodiment, the determining of the type of the at least one of the first sub-map or the second sub-map, or any combination thereof may include identifying a preset map for determining a type of at least one sub-map between the first sub-map and the second sub-map, from a database storing the first main path, and performing type matching between the sub-map and the preset map to determine the type of the sub-map.

In an embodiment, the control method may further include identifying a first unit path planning model and a second unit path planning model in the path planning model, based on that the path planning model includes one or more unit path planning models, providing a user who uses the robot with data about the first unit path planning model and the second unit path planning model, and applying the first sub-map and the second sub-map to a unit path planning model selected by the user, based on receiving a selection of at least one of the first unit path planning model or the second unit path planning model from the user.

BRIEF DESCRIPTION OF THE DRAWINGS

The above and other features and advantages of the present disclosure can be more apparent from the following detailed description taken in conjunction with the accompanying drawings, in which:

FIG. 6 is a table illustrating an example of properties of a sub-map, according to an embodiment of the present disclosure;

FIG. 7 is a table illustrating examples of a path planning model, according to an embodiment of the present disclosure;

FIG. 8 is a table illustrating an example of a type for each sub-map, a time required, an algorithm, a score, and a similarity, according to an embodiment of the present disclosure;

FIG. 9 is a table illustrating an example of a preset map, according to an embodiment of the present disclosure;

FIG. 10 is a table illustrating examples of a first main path, according to an embodiment of the present disclosure;

Figure 1:
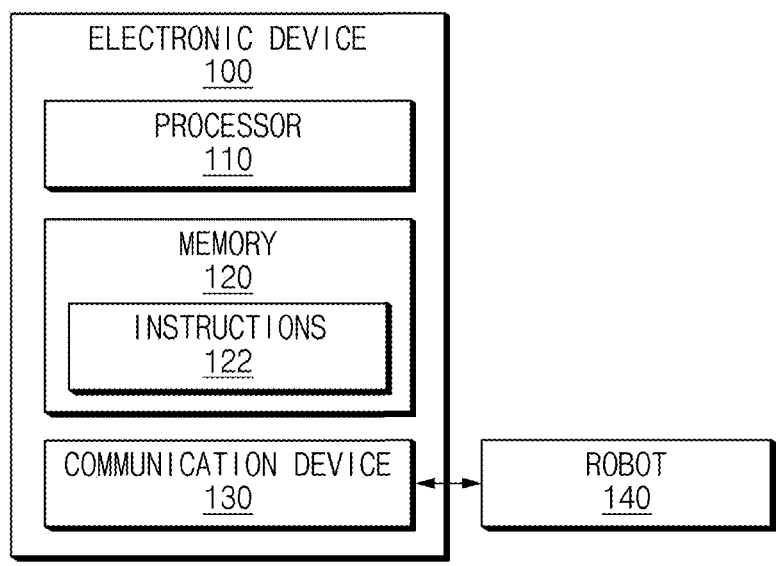
FIG. 1 is a drawing illustrating an electronic device according to an embodiment of the present disclosure.

With regard to description of drawings, same or similar denotations may be used for same or similar components.

DETAILED DESCRIPTION OF ILLUSTRATIVE EMBODIMENTS

Hereinafter, some example embodiments of the present disclosure will be described in detail with reference to the example drawings. In adding the reference numerals to the components of each drawing, it can be noted that an identical component can be designated by identical numerals even when they are displayed on other drawings. In addition, a detailed description of well-known features or functions can be omitted to not unnecessarily obscure the gist of the present disclosure. Hereinafter, various example embodiments of the present disclosure may be described with reference to the accompanying drawings. However, it can be understood that this is not intended to limit the present disclosure to specific implementation forms and includes various modifications, equivalents, and/or alternatives of embodiments of the present disclosure.

In the present disclosure, the terms "first", "second", "A", "B", "(a)", "(b)", and the like, may be used herein. Such terms can be only used to distinguish one component from another component, but do not necessarily limit the corresponding components irrespective of the order or priority of the corresponding components. Furthermore, unless otherwise defined, all terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art. For example, the terms, such as "first", "second", "1st", "2nd", or the like used in the present disclosure may be used to refer to various components regardless of the order and/or the priority and to distinguish one component from another component, but do not necessarily limit the components. For example, a first user device and a second user device can indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It can be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used interchangeably with, for example, the expression "suitable for", "having the capacity to", "designed to", "adapted to", "made to", or "capable of".

The term "configured to" must not necessarily mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. Terms used in the present disclosure can be used to only describe specified example embodiments and are not intended to necessarily limit the scope of another embodiment. Terms of a singular form may include plural forms unless the context clearly indicates otherwise. All the terms used herein, which include technical or scientific terms, may have the same meaning that is generally understood by a person skilled in the art described in the present disclosure. It will be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, C, or any combination thereof" may include any one of, or all possible combinations of the items enumerated together in a corresponding one of the phrases. Particularly, the phrase such as "at least one of A, B, C, or any combination thereof" may include "A", "B", or "C", or "AB" or "ABC", which is a combination thereof.

Hereinafter, some example embodiments of the present disclosure will be described in detail with reference to FIGS. 1 to 12.

FIG. 1 is a drawing illustrating an electronic device according to an embodiment of the present disclosure.

An electronic device 100 according to an embodiment may include a processor 110, a memory 120 including instructions 122, and a communication device 130, any combination of or all of which may be in plural or may include plural components thereof.

The electronic device 100 may indicate a device that generates an optimal path, based on receiving a target map, a starting point, a destination, and a transit point at a target time point. For example, the electronic device 100 may receive a starting point, a destination, and a transit point from a robot 140. To generate an optimal path within a shortest duration in response to a path request, the electronic device 100 may identify whether the same request as the above-mentioned path request is received. In detail, the electronic device 100 may search a database for a first main path including a starting point, a destination, and a transit point. When the first main path is found from the database, the electronic device 100 may transmit the first main path to the robot 140 in response to the above-mentioned path request.

The electronic device 100 may generate a second main path, based on at least one of the starting point, the destination, or the transit point of the first main path being different from points (e.g., a starting point, a destination, and a transit point) of the above-mentioned path request. In detail, the first main path may indicate a path generated by a starting point, a destination, and a transit point at a time point prior to the target time point. The second main path may indicate a path generated by a starting point, a destination, and a transit point at the target time point. The electronic device 100 may perform the following operations to generate the second main path.

The electronic device 100 may segment the target map to obtain a first sub-map and a second sub-map. For example, each of the first sub-map and the second sub-map may be a portion of the target map. Furthermore, the electronic device 100 may segment the target map to generate at least two sub-maps. However, for convenience of description in the specification, the example of generating the first sub-map and the second sub-map from the target map is mainly described. Each of the first sub-map and the second sub-map may be a map obtained by transit points on the target map. A detailed description associated with it will be given below with reference to FIG. 4.

The electronic device 100 may obtain a first sub-path of the first sub-map and a second sub-path of the second sub-map, based on obtaining the first sub-map and the second sub-map. For example, when the target map includes only the first sub-map and the second sub-map, the second main path may be a path in which the first sub-path and the second sub-path are connected with each other.

The electronic device 100 may asynchronously perform the operation of obtaining the first sub-path from the first sub-map and the operation of obtaining the second sub-path from the second sub-map, and a detailed description of such will be given below with reference to FIG. 11.

The electronic device 100 may use at least one path planning algorithm to obtain the sub-path (e.g., the first sub-path or the second sub-path) from the sub-map (e.g., the first sub-map or the second sub-map). In detail, the electronic device 100 may apply the sub-map to a path planning model trained to calculate an optimal path on the map to obtain the sub-path. The path planning model may include at least one unit path planning model. The unit path planning model may be a model to which at least one of the above-mentioned path planning algorithms is applied.

Illustratively, the electronic device 100 may apply the first sub-map to a first unit path planning model to obtain a 1-1st sub-path. The electronic device 100 may apply the first sub-map to a second unit path planning model to obtain a 1_2nd sub-path. The electronic device 100 may determine a score for each of the 1_1st sub-path and the 1_2nd sub-path. The electronic device 100 may determine an algorithm suitable for the first sub-map, based on a comparison between the score of the 1_1st sub-path and the score of the 1_2nd sub-path. A detailed description of such operations will be described below with reference to FIGS. 6 to 7. Through such operations, the electronic device 100 may efficiently generate a movement path (i.e., the second main path) of the robot 140 on the target map by use of a resource (e.g., a multi-core or a multi-thread) available in the path planning operation.

The electronic device 100 may generate the movement path of the robot 140 on the target map through the above-mentioned operations, thus achieving the following advantages. In detail, the electronic device 100 may reduce resource consumption cost of the robot 140. For example, the electronic device 100 may transmit the previously generated first main path, without generating the second main path in the same condition (e.g., a condition in which points are the same as each other), thus reducing resource consumption cost of the robot 140. Furthermore, the electronic device 100 may decrease battery consumption of the robot 140 and may increase an operating time. In addition, the electronic device 100 may quickly transmit the result (e.g., the first main path or the second main path) in response to the path request. For example, the electronic device 100 may fail to generate the second main path in the same condition, that is, may generate only the initial first main path in the same condition, thus quickly transmitting the result in response to the path request.

The processor 110 may execute software and may control at least one other component (e.g., a hardware or software component) connected with the processor 110. In addition, the processor 110 may perform a variety of data processing or calculation. For example, the processor 110 may store the target map, a point group including points set on the target map, the first main path, the second main path, and the like in the memory 120.

For reference, the processor 110 may perform all operations performed by the electronic device 100. Therefore, for convenience of description in the specification, the operation performed by the electronic device 100 is mainly described as an operation performed by the processor 110. Furthermore, for convenience of description in the specification, the processor 110 is mainly described as, but not limited to, one processor. For example, the electronic device 100 may include at least one processor, together or distributed. Each of the at least one processor may perform all operations associated with the operation of identifying the first main path and generating the second main path.

The memory 120 may temporarily and/or permanently store various pieces of data and/or information required to perform the operation of identifying the first main path and generating the second main path. For example, the memory 120 may store the target map, the point group including the points set on the target map, the first main path, the second main path, and the like.

The communication device 130 may assist in performing communication between the electronic device 100 and the robot 140. For example, the communication device 130 may include one or more components for performing communication between the electronic device 100 and the robot 140. For example, the communication device 130 may include a short range wireless communication unit, a microphone, or the like. A short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like, for example.

Figure 2:
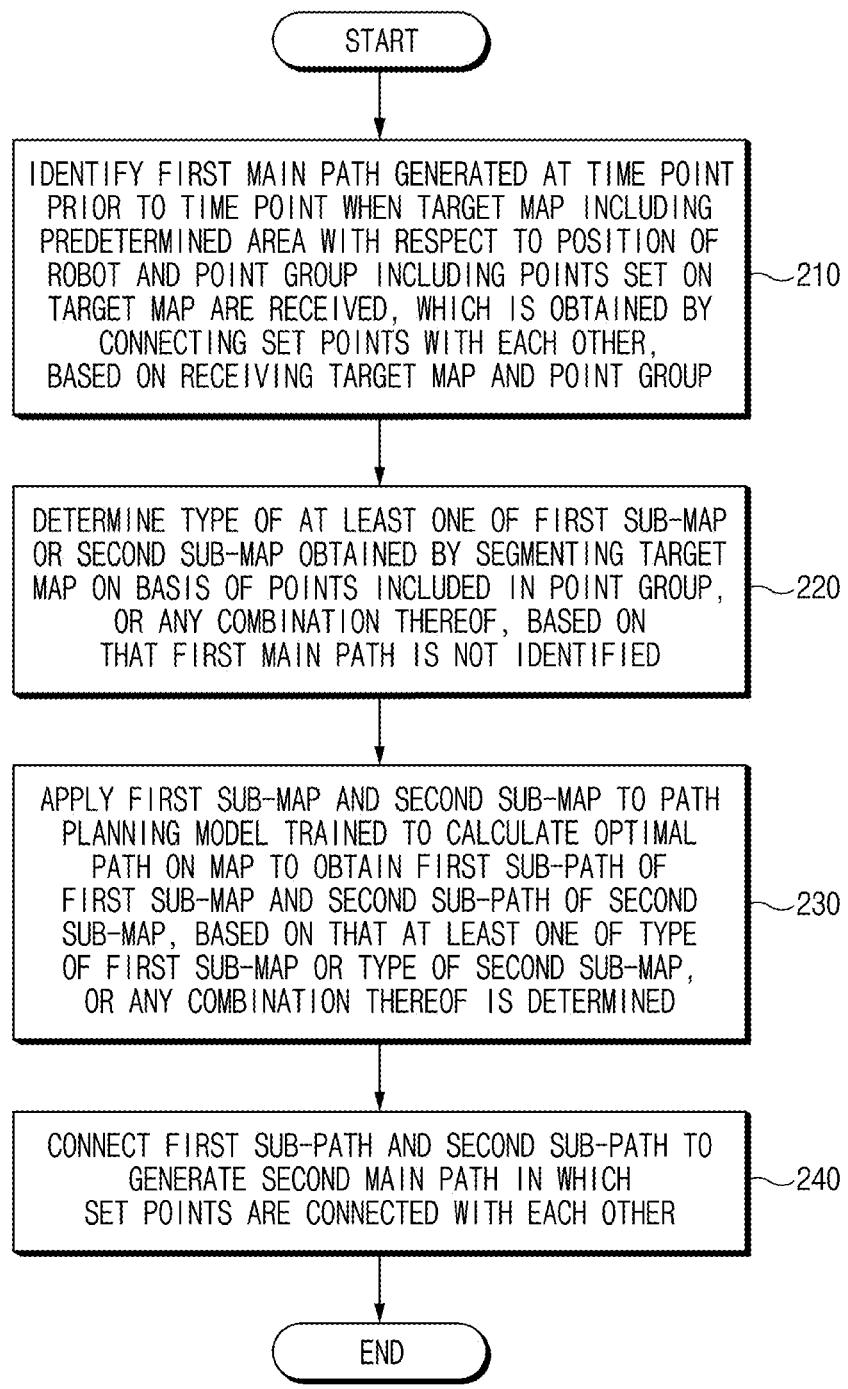
FIG. 2 is a flowchart illustrating a control method of an electronic device according to an embodiment of the present disclosure.

FIG. 2 is a flowchart illustrating a control method of an electronic device according to an embodiment of the present disclosure.

In operation 210, an electronic device (e.g., an electronic device 100 of FIG. 1) according to an embodiment may identify a first main path generated at a time point prior to a time point when a target map including a predetermined area with respect to a position of a robot and a point group including points set on the target map are received and obtained by connecting the set points with each other, based on receiving the target map and the point group.

The electronic device may receive the target map and the point group from the robot. The target map may include an area to which the robot will move, with respect to the position of the robot. The point group may include at least one point. In detail, the point group may include a starting point, a destination, and a transit point. The starting point may include a position at a time point when the robot transmits a path request to the electronic device. The destination may include a position set to a target through movement by the robot. The transit point may include a point at which the robot performs operations capable of being provided to a user, while moving from the starting point to the destination.

The first main path may indicate a path generated at the time point prior to the time point when the target map and the point group are received and obtained by connecting the set points with each other. In other words, when the first main path is identified, based on receiving the target map and the point group, the electronic device may transmit the first main path to the robot. Through such an operation, the electronic device may quickly respond to the path request of the robot. In detail, the electronic device may perform a comparison between the point group and a point group of the first main path. For example, when the time point when the first main path is generated is a first time point and when the time point when the electronic device receives the target map and the point group is a second time point, the electronic device may perform the following operations. The electronic device may compare a starting point at the first time point with a starting point at the second time point. The electronic device may compare a destination at the first time point with a destination at the second time point. The electronic device may compare a transit point at the first time point with a transit point at the second time point. When positions of the respective points are less than or equal to a predetermined distance as a result of comparing the starting points, comparing the destinations, and comparing the transit points, the electronic device may identify the respective points as the same points.

In operation 220, the electronic device may determine a type of at least one of a first sub-map or a second sub-map obtained by segmenting the target map on the basis of the points included in the point group, or any combination thereof, based on that the first main path is not identified. For example, the electronic device may segment the target map to obtain the first sub-map and the second sub-map. The electronic device may perform segmentation of the target map on the basis of transit points among the points included in the point group. A detailed description of segmenting the target map will be described below with reference to FIGS. 3 to 4.

The electronic device may determine the type of the at least one of the first sub-map or the second sub-map, or any combination thereof. For example, the type of the sub-map may include a pattern of the sub-map. The pattern of the sub-map may indicate a shape (e.g., a hallway type, an interior type, a foyer type, a road type, or the like) in which a specific space (e.g., a hallway, an interior, a foyer, a road, or the like) is abstracted. In detail, the pattern of the sub-map may include a preset of the sub-map and may include a predetermined map shape. The type of the sub-map will be described in detail below with reference to FIG. 9.

In operation 230, the electronic device may apply the first sub-map and the second sub-map to a path planning model trained to calculate an optimal path on a map to obtain a first sub-path of the first sub-map and a second sub-path of the second sub-map, based on at least one of the type of the first sub-map, the type of the second sub-map, or any combination thereof being determined.

Illustratively, when the type of the sub-map (e.g., the first sub-map or the second sub-map) is similar to a type of a preset map, the electronic device may determine the type of the sub-map as the type of the preset map. When the type of the sub-map is similar to the type of the preset map, the electronic device may apply the sub-map to the path planning model used in the preset map.

Illustratively, when the type of the sub-map is not similar to the type of the preset map, the electronic device may newly define the type of the sub-map. When the type of the sub-map is newly defined, the electronic device may apply the sub-map to the path planning model including at least one unit path planning model. The electronic device may apply the sub-map to the path planning model including the at least one unit path planning model to obtain at least one sub-path on one sub-map. The electronic device may determine a sub-path of the sub-map by use of a comparison of a score of each of the at least one sub-path. A detailed description associated with such operation will be given below with reference to FIG. 8.

In operation 240, the electronic device may connect the first sub-path and the second sub-path to generate a second main path in which the set points are connected with each other. For example, when the target map includes only the first sub-map and the second sub-map, a path (i.e., a second main path) in which the first sub-path and the second sub-path can be connected with each other may include point groups. The second main path may include an optimal path obtained by use of the first sub-map and an optimal path obtained by use of the second sub-map. The electronic device may obtain an optimal path of each (e.g., the sub-map) of maps segmented from the target map to obtain the second main path, which is an optimal path of the target map. The electronic device may transmit the second main path to the robot, based on the second main path being generated.

Figure 3:
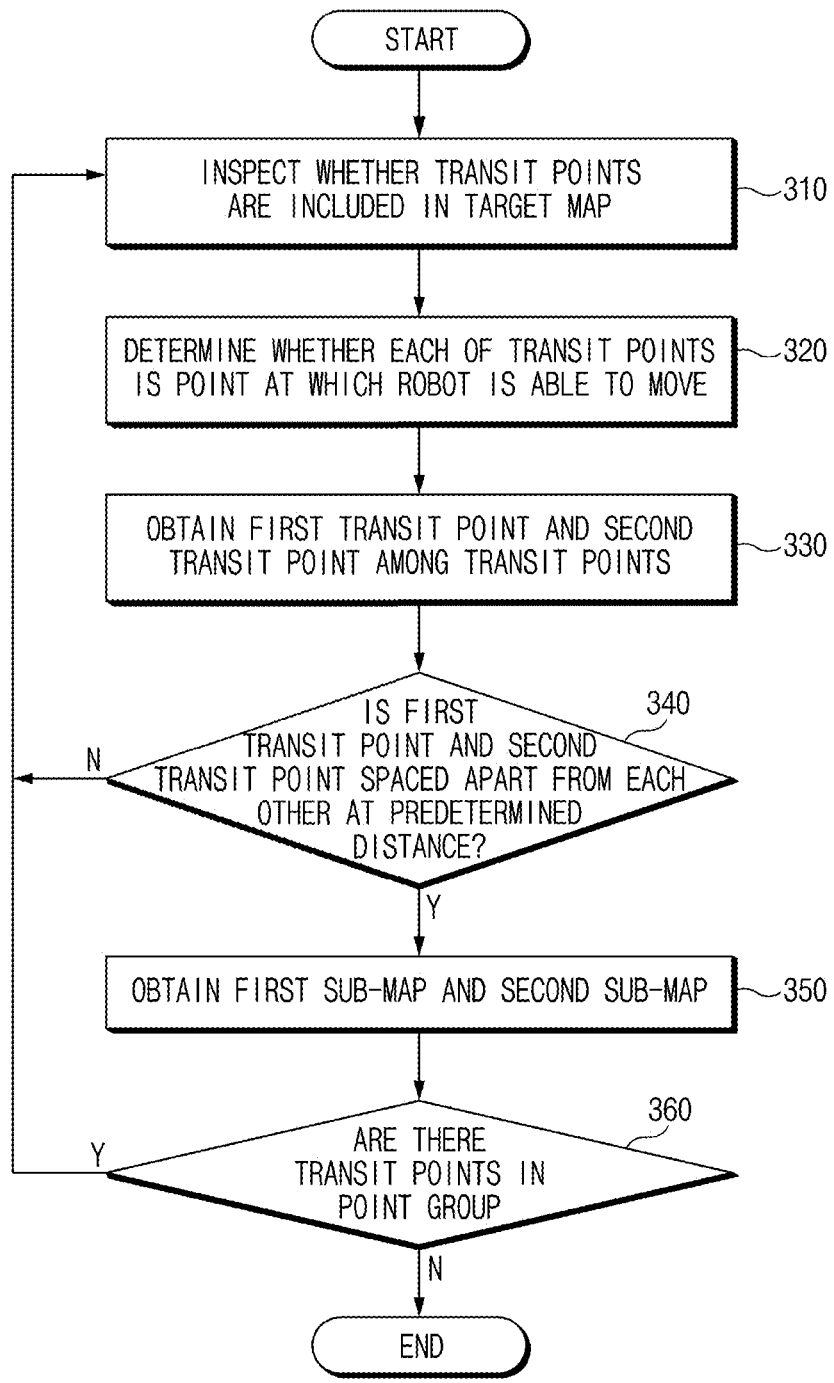
FIG. 3 is a flowchart for describing a method for segmenting a target map according to an embodiment of the present disclosure.

FIG. 3 is a flowchart for describing a method for segmenting a target map, in an electronic device according to an embodiment of the present disclosure.

In operation 310, an electronic device (e.g., an electronic device 100 of FIG. 1) according to an embodiment may inspect whether transit points are included in a target map. For example, when the transit points are not included in the target map, the electronic device may recognize a path request as an error to perform a skip. Furthermore, in operation 310, the electronic device may detect a data error and may transmit a stable path to a robot.

In operation 320, the electronic device may determine whether each of the transit points is a point at which the robot is able to move, based on the transit points being included in the target map. For example, although the transit points are included in the target map, when each of the points is a point at which the robot is unable to move, the electronic device may recognize the path request as an error to perform a skip. Furthermore, in operation 320, the electronic device may detect a data error and may transmit a stable path to the robot.

In operation 330, the electronic device may identify transit points among points included in a point group to obtain a first transit point and a second transit point among the transit points. For example, the first transit point and the second transit point may be consecutive transit points on the target map among the transit points included in the point group. The electronic device may segment a sub-map from the target map, on the basis of the consecutive transit points (e.g., the first transit point and the second transit point).

In operation 340, the electronic device may inspect whether the first transit point and the second transit point are spaced apart from each other at a predetermined distance. For example, when the distance between the first transit point and the second transit point is less than or equal to the predetermined distance, the electronic device may segment a sub-map from the target map, on the basis of the first transit point and the second transit point. In operation 340, the electronic device may prevent a probability that the sub-map will be excessively segmented from the target map to be guided to a wrong path compared to the performance benefit. Furthermore, when the distance between the first transit point and the second transit point is less than or equal to the predetermined distance, the electronic device may perform operation 310 again.

When the distance between the first transit point and the second transit point is greater than or equal to the predetermined distance, in operation 350, the electronic device may obtain a first sub-map and a second sub-map. A detailed method for obtaining the sub-map will be described below with reference to FIG. 4.

In operation 360, the electronic device may inspect whether there are transit points in a point group. For example, when transit points except for the first transit point and the second transit point are included in the point group, the electronic device may obtain a new sub-map on the basis of the transit points except for the first transit point and the second transit point.

Figure 4:
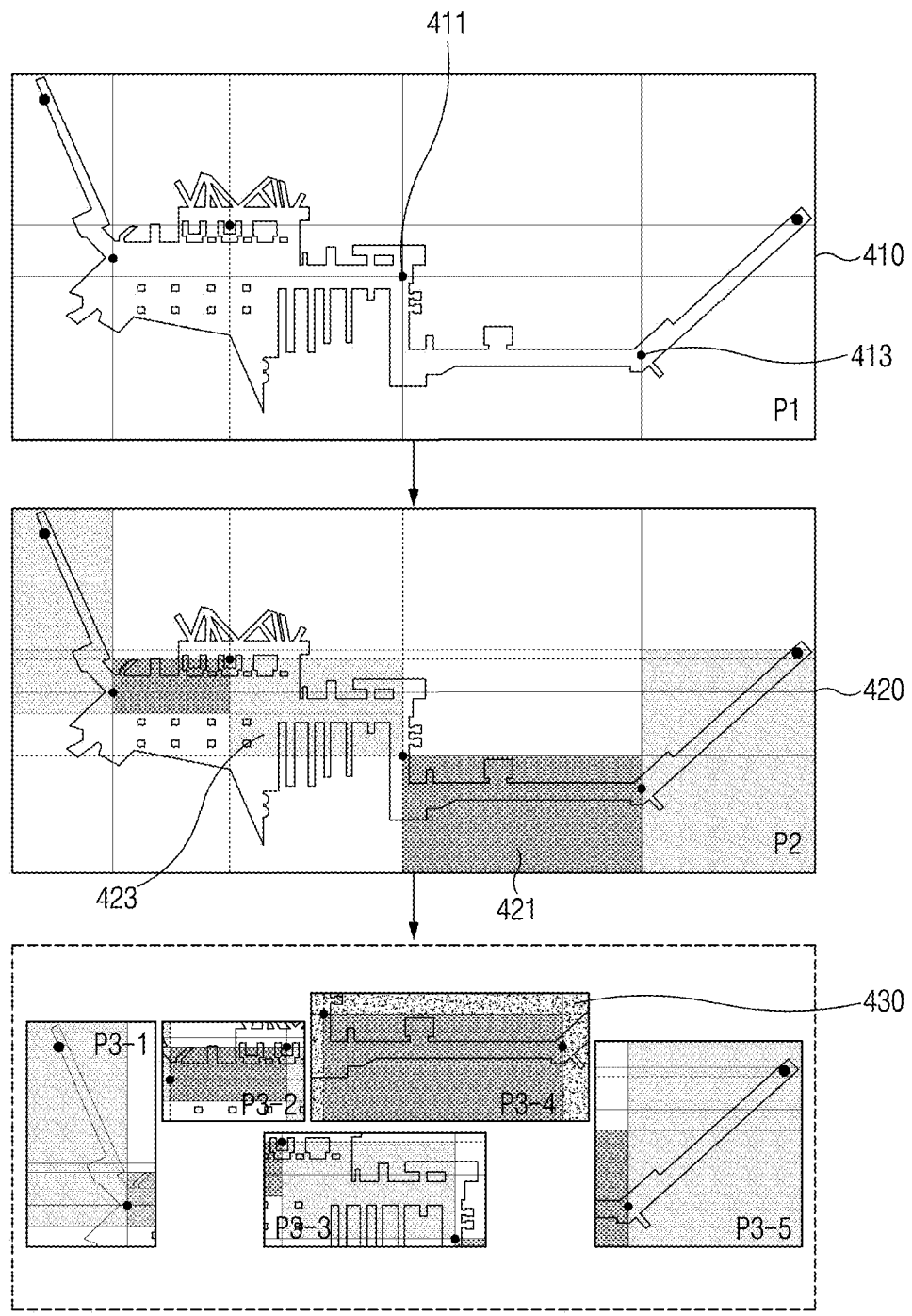
FIG. 4 is a drawing illustrating a process of obtaining a sub-map from a target map, according to an embodiment of the present disclosure.

FIG. 4 is a drawing illustrating a process of obtaining a sub-map from a target map, in an electronic device according to an embodiment of the present disclosure.

An electronic device (e.g., an electronic device 100 of FIG. 1) according to an embodiment may identify a starting point, a destination, and a transit point from a target map 410. The electronic device may obtain a first transit point 411 included in transit points from the target map 410 and may obtain a second transit point 413 different from the first transit point 411 among points spaced apart from the first transit point 411 at a predetermined distance. The target map 410 may include a point group (e.g., a starting point, a destination, and a transit point) and may be used as a transmitted input value, when a path request is transmitted from a robot to the electronic device.

The electronic device may segment the target map 410 on the basis of the first transit point 411 and the second transit point 413 to obtain a first sub-map 421 and a second sub-map 423. In detail, a sub-map group 420 may include a plurality of sub-maps (e.g., the first sub-map 421 and the second sub-map 423).

Illustratively, the electronic device may obtain the first sub-map 421 that includes the first transit point 411 and the second transit point 413 and includes an area between the first transit point 411 and the second transit point 413, based on the first transit point 411 and the second transit point 413. Similarly, the electronic device may obtain a third transit point different from the second transit point 413 (i.e., the closest transit point to the second transit point 413) among the second transit point 413 and points spaced apart from the second transit point 413 at a predetermined distance. The electronic device may obtain the second sub-map 423, on the basis of the second transit point 413 and the third transit point. The electronic device may ignore and/or skip an area unnecessary for a path request on the target map 410, in the operation of segmenting the target map 410 to obtain the sub-map.

The electronic device may identify a boundary point with the highest distance from a center point of the first sub-map 421 among the center point of the first sub-map 421 and points spaced apart from the center point on the first sub-map 421. The electronic device may determine a sub-area 430 including points spaced apart from the center point at a distance between the center point and the boundary point and a predetermined distance. For example, in preparation that a straight course to the transit point and the destination is blocked, the sub-area 430 may include a clearance for the robot to take a detour and return. The electronic device may determine the first sub-map 421 as the sub-area 430. In detail, the electronic device may combine the sub-area 430 with the first sub-map 421. In other words, the sub-area 430 may indicate an area in which the first sub-map 421 and an area including the clearance for the robot to take a detour and return are combined with each other.

Figure 5:
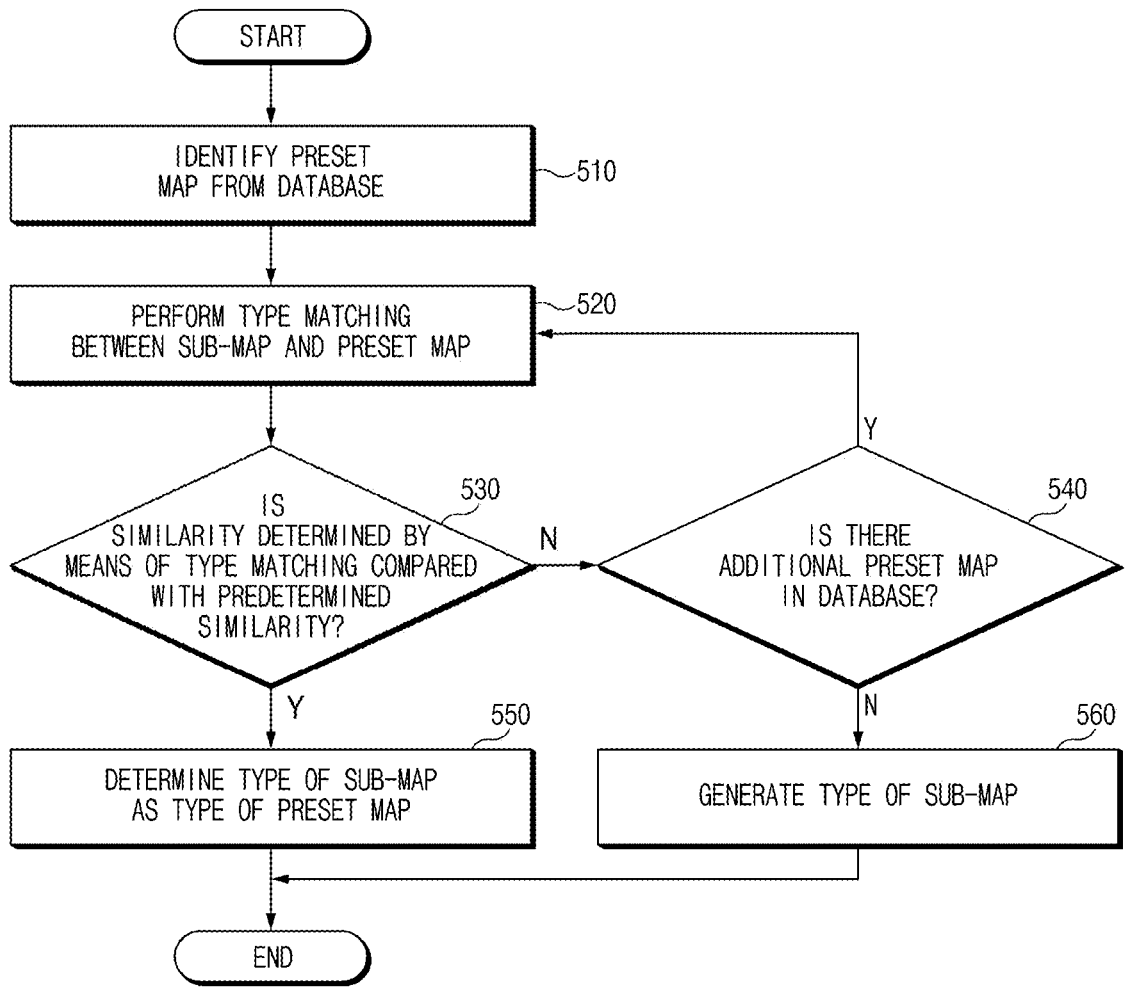
FIG. 5 is a flowchart illustrating a method for determining a type of a sub-map, according to an embodiment of the present disclosure.

FIG. 5 is a flowchart illustrating a method for determining a type of a sub-map, according to an embodiment of the present disclosure.

In operation 510, an electronic device (e.g., an electronic device 100 of FIG. 1) according to an embodiment may identify a preset map from a database. The preset map may include a map used to determine a type of a sub-map. For example, the preset map may include items, such as a maze, an apartment hallway, a hotel lobby, or an intersection, in which a clear feature is revealed. In detail, the electronic device may identify a preset map for determining a type of at least one sub-map between a first sub-map and a second sub-map, from the database which stores a first main path.

In operation 520, the electronic device may perform type matching between the sub-map and the preset map. For example, the electronic device may perform the type matching between the sub-map and the preset map to determine a type of the sub-map. The type matching operation may include an operation of determining a similarity between the sub-map and the preset map.

In operation 530, the electronic device may perform an operation of comparing the similarity determined through the type matching operation with a predetermined similarity. For example, the electronic device may adjust the sub-map and the preset map to a predetermined size. The electronic device may identify a first pixel of the sub-map and a second pixel at the same position as the first pixel on the preset map. The electronic device may perform type matching, based on a difference between the first pixel and the second pixel. The electronic device may determine the similarity between the sub-map and the preset map, based on performing the type matching. In detail, the electronic device may determine a similarity, based on Equation 1 below.

$$d = \sqrt{(X_2 - X_1)^2 + (Y_2 - Y_1)^2} \quad \text{[Equation 1]}$$

In Equation 1, d may refer to the similarity between the first pixel and the second pixel, $(X_1, Y_1)$ may refer to the first pixel, and $(X_2, Y_2)$ may refer to the second pixel.

The electronic device may determine a similarity between all pixels of the sub-map and all pixels of the preset map, by use of Equation 1 above. The electronic device may determine the similarity between the sub-map and the preset map by use of the similarity between all the pixels of each of the sub-map and the preset map. However, the method for determining the similarity between the sub-map and the preset map is not limited thereto. For example, the electronic device may calculate an object-based similarity (e.g., divide a building, a number, and the like into an object and calculate a similarity using a size of the object, a shape of the object, a relationship with a surrounding terrain, and the like) and may determine the similarity between the sub-map and the preset map by use of logistic regression and linear discriminant analysis.

In operation 540, the electronic device may inspect whether there is an additional preset map in the database, based on that the similarity is not greater than the predetermined similarity. When there is the additional preset map in the database, the electronic device may perform operation 520 again. Otherwise, when there is no additional preset map in the database, in operation 560, the electronic device may generate a type of the sub-map. The newly generated type of the sub-map may be stored as a name of "Auto_generated_xxx" in the database.

In operation 550, the electronic device may determine the type of the sub-map as a type of the preset map, based on the similarity being greater than the predetermined similarity. The electronic device may determine a sub-path of the preset map as a sub-path of the sub-map, without obtaining a sub-path of the sub-map, based on that the type of the sub-map is determined as the type of the preset map.

FIG. 6 is a table illustrating an example of properties of a sub-map, in an electronic device according to an embodiment of the present disclosure.

Referring to FIG. 6, FIG. 6 illustrates properties 600 of the sub-map. For example, the properties 600 of the sub-map may include a path length of the sub-path, a time required, and a cost. In detail, the path length of the sub-path may indicate the length of the sub-path obtained by an electronic device (e.g., an electronic device 100 of FIG. 1). The electronic device may apply the sub-map to a path planning model to obtain a sub-path. The sub-path may indicate an optimal path along that a robot can move on the sub-map.

The time required may include an interval between a time point when the sub-map is applied to the path planning model and a time point when the sub-path is obtained. The cost may indicate a cost obtained based on usage of a processor (e.g., a processor 110 of FIG. 1) and usage of a memory (e.g., a memory 120 of FIG. 1) during the time required. For example, the cost may include a usage rate of the processor during a usage time of a thread executable by the processor. The electronic device may obtain a cost, based on the usage rate of the processor and a usage rate of the memory.

Referring to FIG. 6, the electronic device may apply a plurality of unit path planning models to one sub-map. Illustratively, the unit path planning model may include an A* algorithm, a BestFirstSearch algorithm, a JumpPointSearch algorithm, a Dijkstra algorithm, an RRT algorithm, and a user definition (e.g., shown as User_custom_01 in FIG. 6) algorithm. The electronic device may apply one sub-map to each of the plurality of unit path planning models to obtain properties (e.g., a path length of a sub-path, a time required, and a cost) of a plurality of sub-maps. The electronic device may asynchronously perform the operation of applying the sub-map to each of the plurality of unit path planning models. A detailed description associated with such will be given below with reference to FIG. 11.

FIG. 7 is a table illustrating examples of a path planning model, in an electronic device according to an embodiment of the present disclosure.

Referring to FIG. 7, FIG. 7 illustrates an example 700 of the path planning model. For example, the path planning model may include at least one unit path planning model. The unit path planning model may indicate a model that outputs a sub-path from a sub-map, by use of one algorithm. As shown in FIG. 7, the unit path planning model may include an applied algorithm, an option, and a setting value.

An electronic device (e.g., an electronic device 100 of FIG. 1) may identify a first unit path planning model (e.g., a model to which No. 1 algorithm shown in FIG. 7 is applied) and a second unit path planning model (e.g., a model to which No. 3 algorithm shown in FIG. 7 is applied), based on that the path planning model includes one or more unit path planning models. The electronic device may provide a user who uses a robot with data about the first unit path planning model and the second unit path planning model. As a result, the electronic device may apply a first sub-map and a second sub-map to a unit path planning model selected by the user, based on receiving the selection of at least one of the first unit path planning model or the second unit path planning model from the user.

The electronic device may provide the user with an example 700 of the path planning model shown in FIG. 7 in the form of a user interface. The user may use an edit function for adding, correcting, and deleting the example 700 of the path planning model. Furthermore, the user may correct the example 700 of the path planning model to use a unit generation model to which a set algorithm (e.g., User_custom_01 and User_coustom_02 algorithms shown in FIG. 7) is applied in preference to the operation of obtaining the sub-path from the sub-map, by use of the setting value.

The unit path planning model is not limited to the above-mentioned algorithms. For example, the unit path planning model may indicate a machine learning model trained to calculate an optimal path on a map. In detail, the electronic device may train the unit path planning model. Illustratively, the unit path planning model may include a neural network. The neural network may include a plurality of layers. Each layer may include a plurality of nodes. The node may include a node value determined based on an activation function. A node of any layer may be connected with a node (e.g., another node) of another layer through a link (e.g., a connection edge) with a connection weight. The node value of the node may be propagated to other nodes through the link. In an inference operation of the neural network, node values may be forward propagated in the direction of a next layer from a previous layer.

Illustratively, the forward propagation calculation in the unit path planning model may indicate calculation of propagating a node value based on input data, in the direction facing the output layer from the input layer of the unit path planning model. In other words, a node value of the node may be propagated (e.g., forward propagated) to a node (e.g., a next node) of a next layer connected with the node through the connection edge. For example, the node may receive a value weighted by the connection weight from a previous node (e.g., a plurality of nodes) connected through the connection edge.

The node value of the node may be determined based on applying an activation function to the sum (e.g., weighted sum) of weighted values received from previous nodes. The parameter of the neural network may illustratively include the above-mentioned connection weight. The parameter of the neural network may be updated to be changed in a direction in which an objective function value, which will be described below, is targeted (e.g., a direction in which a loss is minimized).

The trained unit path planning model may indicate a model trained by use of machine learning and may be a trained machine learning model that outputs a training output (e.g., a sub-path) from a training input (e.g., a sub-map). The machine learning model (e.g. the trained unit path planning model) may be generated by use of machine learning. A learning algorithm may include, for example, but is not limited to, supervised learning, unsupervised learning, semi-supervised learning, or reinforcement learning.

The machine learning model may include a plurality of artificial neural network layers. In detail, the trained unit path planning model may include a shared layer including at least one convolution operation and a plurality of classifier layers (e.g., task-specific layers) connected with the shared layer. An artificial neural network may be, but is not limited to, a combination of at least one of a deep neural network (DNN), a convolutional neural network (CNN), a U-net for image segmentation (U-net), a recurrent neural network (RNN), a restricted Boltzmann machine (RBM), a deep belief network (DBN), a bidirectional recurrent deep neural network (BRDNN), deep Q-networks, or any combination thereof, for example.

For supervised learning, the above-mentioned machine learning model may be trained based on training data including a pair of a training input and a training output mapped to the training input. For example, the machine learning model may be trained to output a training output from a training input. The machine learning model while trained may generate a temporary output in response to the training input and may be trained such that a loss of the temporary output and the training output (e.g., a training target) is minimized. A parameter of the machine learning model during a learning process (e.g., a connection weight between nodes/layers in the neural network) may be updated according to a loss. Such learning may be performed in the electronic device itself in which the machine learning model is performed or may be performed by use of a separate server. The machine learning model, the training of which is performed, (e.g., the trained unit path planning model) may be stored in a memory (e.g., a memory 120 of FIG. 1).

FIG. 8 is a table illustrating an example of a type for each sub-map, a time required, an algorithm, a score, and a similarity, according to an embodiment of the present disclosure.

Referring to FIG. 8, FIG. 8 illustrates an example of a type for each sub-map, a time required, an algorithm, a score, and a similarity. For example, a table 800 may be stored in a database.

An electronic device (e.g., an electronic device 100 of FIG. 1) according to an embodiment may apply a first sub-map (e.g., shown as a sub-map P3-1 in FIG. 8) to a first unit path planning model (e.g., shown as Dijkstra_01 in FIG. 7) to obtain a 1-1st sub-path and may apply the first sub-map to a second unit path planning model (e.g., shown as A_01 in FIG. 7) to obtain a 1-2nd sub-path.

The electronic device may perform a comparison between scores calculated while obtaining the 1_1st sub-path and the 1_2nd sub-path for the first sub-map. For example, the electronic device may obtain a first time required, including an interval between a time point when the first sub-map is applied to the first unit path planning model and a time point when the 1_1st sub-path is obtained. The electronic device may obtain a first cost, based on usage of a processor and usage of a memory during the first time required. The electronic device may obtain a second time required, including an interval between a time point when the first sub-map is applied to the second unit path planning model and a time point when the 1_2nd sub-path is obtained. The electronic device may obtain a second cost, based on usage of the processor and usage of the memory during the second time required.

The electronic device may apply a predetermined weight group to each of the first time required, the first cost, and the length of the first sub-path to determine a first score. The electronic device may apply the weight group to each of the second time required, the second cost, and the length of the second sub-path to determine a second score. The electronic device may obtain the first sub-path based on a comparison between the first score and the second score.

The electronic device may include a unit path planning model for obtaining the first sub-path, a time required, a score, and a similarity between the first sub-map and the preset map in the table 800.

FIG. 9 is a table illustrating an example of a preset map, according to an embodiment of the present disclosure.

FIG. 9 illustrates an example 900 of the preset map. For example, the example 900 of the preset map may include a description, an algorithm, a setting, and a storage path. In detail, the description of the preset map may include a description of a target in which the preset map is abstracted. The algorithm of the preset map may indicate an algorithm selected by a user by a predetermined number from an order in which a score is highest, based on the score calculated in FIG. 6. Such an algorithm may be immediately applied to a sub-map with a high similarity with the preset map. The setting of the preset map may indicate a setting of the user. In other words, the user may input a setting value to determine whether to use the preset map.

FIG. 10 is a table illustrating examples of a first main path, in an electronic device according to an embodiment of the present disclosure.

FIG. 10 illustrates an example 1010 of the first main path. For example, as described above with reference to FIG. 1, the first main path may indicate a path generated by a starting point, a destination, and a transit point at a time point prior to a target time point. In detail, the example 1010 of the first main path may include a description of the first main path, a point of the first main path, and a path of the first main path.

The description of the first main path may illustratively include a width and a length of an alleyway. The point of the first main path may indicate points (i.e., a starting point, a destination, and a transit point) received in an electronic device (e.g., an electronic device 100 of FIG. 1) at a time point when the first main path is generated. The path of the first main path may include points a robot should essentially visit on a target map to move along the first main path.

Figure 11:
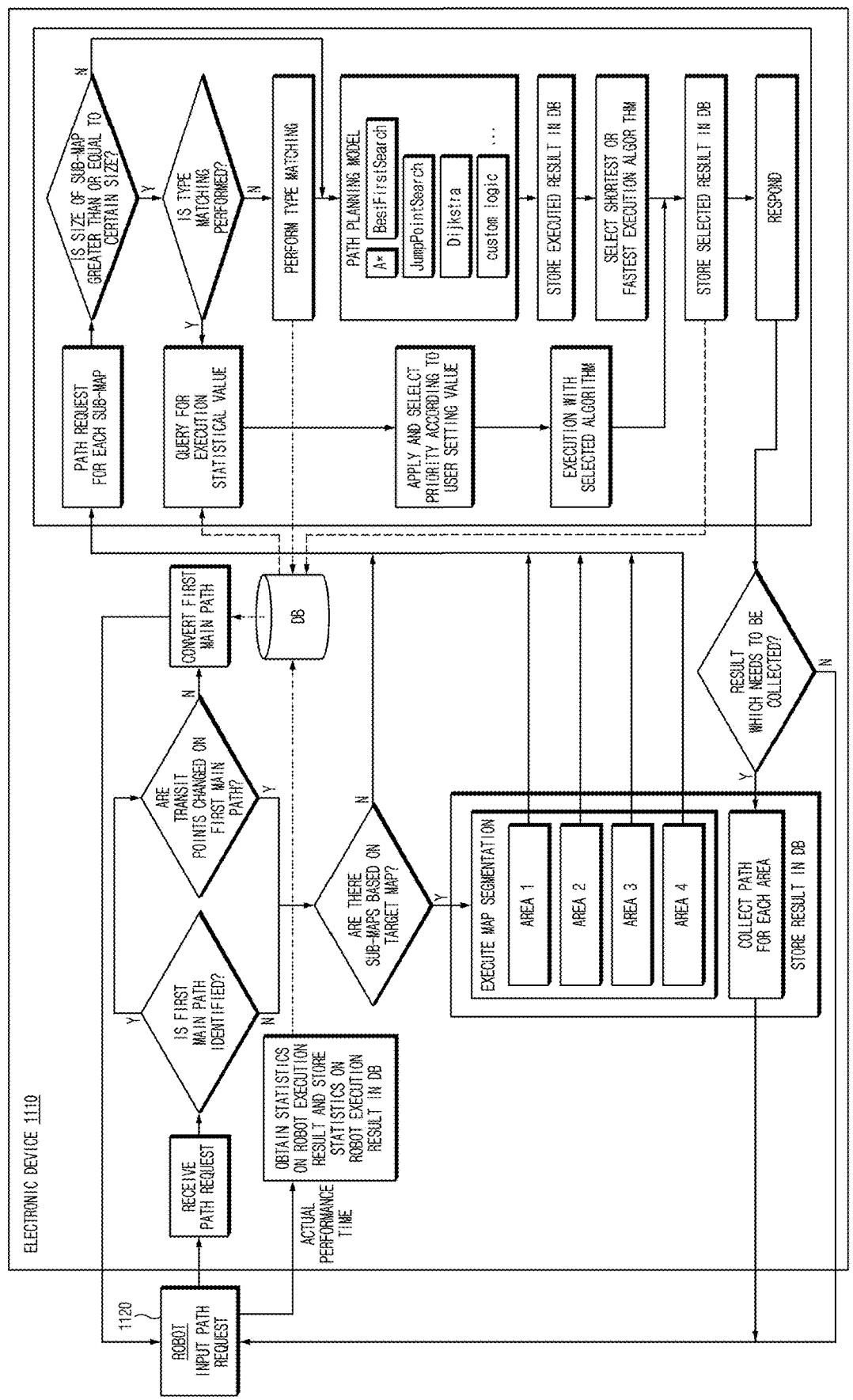
FIG. 11 is a flowchart illustrating a method for generating a second main path, according to an embodiment of the present disclosure.

FIG. 11 is a flowchart illustrating a method for generating a second main path, according to an embodiment of the present disclosure.

An electronic device 1110 according to an embodiment may receive a path request from a robot 1120. The robot 1120 may transmit the result of performing path planning internally in the robot 1120, as well as transmitting a target map and a point group to the electronic device 1110.

The electronic device 1110 may determine whether a first main path is identified and whether transit points are changed on the first main path, based on receiving the path request from the robot 1120. When the first main path is identified and the transit points are not changed on the first main path, the electronic device 1110 may transmit the first main path in response to the path request of the robot 1120.

The electronic device 1110 may determine whether there are sub-maps in a database, based on a target map. For example, when there is a history in which a sub-map is segmented by use of the target map, the electronic device 1110 may fail to newly segment the sub-map from the target map.

When there are no sub-maps in the database based on the target map, the electronic device 1110 may segment the target map to obtain sub-maps. The electronic device 1110 may perform type matching of the sub-map, based on that the size of the sub-map is greater than or equal to a certain size. In detail, the electronic device 1110 may determine a similarity between the sub-map and a preset map, based on performing the type matching, and may determine a type of the sub-map as a type of the preset map, based on that the similarity is greater than a predetermined similarity. Otherwise, the electronic device 1110 may generate the type of the sub-map, based on that the similarity is not greater than the predetermined similarity.

The electronic device 1110 may apply the sub-map to a path planning model, based on that the type of the sub-map is generated. The electronic device 1110 may apply the sub-map to the path planning model to obtain a sub-path of the sub-map. The electronic device 1110 may apply the first sub-map to a first path planning model (or a first unit path planning model) to obtain a 1-1st sub-path, by use of a first processor. The electronic device 1110 may apply the first sub-map to a second path planning model (or a second unit path planning model) to obtain a 1_2nd sub-path, by use of a second processor. The electronic device 1110 may asynchronously perform an operation of the first processor and an operation of the second processor by use of a target processor.

The electronic device 1110 may generate a second main path of the target map, based on performing the above-mentioned operations for all sub-maps segmented from the target map. Illustratively, for a result that needs to collect and/or combine all the sub-maps segmented from the target map, the electronic device 1110 may generate the second main path by collecting and/or combining sub-paths for each sub-map.

The electronic device 1110 may perform the operations shown in FIG. 11 to have the following advantages. For example, the electronic device 1110 may have the advantage of improving a scheme for processing a path planning operation in only the internal system of the robot 1120 and providing various selections in selecting a map-based path planning algorithm. As a result, the electronic device 1110 may have the advantage of maximizing performance without a change in hardware of the robot 1120 through parallel processing of path planning, like a cloud server.

Figure 12:
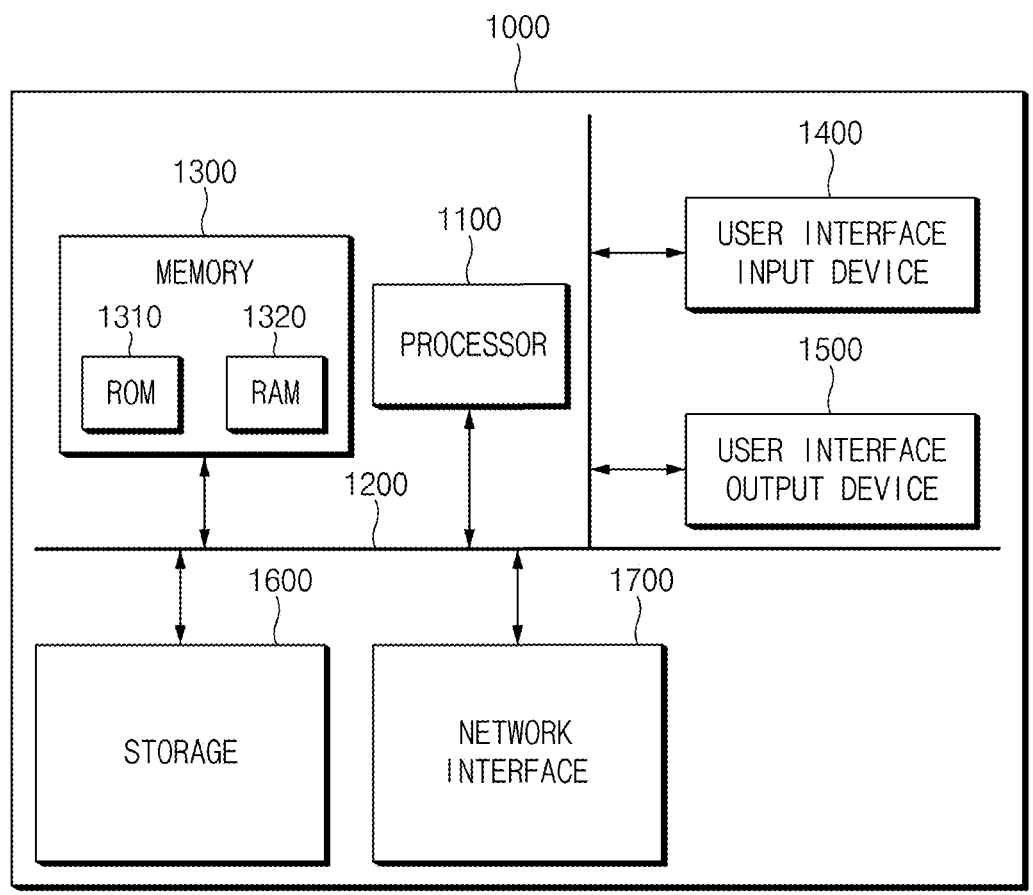
FIG. 12 is a drawing illustrating a computing system associated with an electronic device or a control method thereof according to an embodiment of the present disclosure.

FIG. 12 is a drawing illustrating a computing system associated with an electronic device or a control method thereof according to an embodiment of the present disclosure.

Referring to FIG. 12, a computing system 1000 about the electronic device or the control method thereof may include at least one processor 1100, a memory 1300, a user interface input device 1400, a user interface output device 1500, storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to example embodiments and the accompanying drawings, the present disclosure is not necessarily limited thereto, but may be variously modified and altered by those skilled in the art to which the present disclosure pertains without departing from the spirit and scope of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device that may execute instructions and respond. A processing unit may perform an operating system (OS) or a software application running on the OS. Further, the processing unit may access, store, manipulate, process and generate data in response to execution of software. It can be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor, together or distributed.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions that may be executed through various computer systems and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the some example embodiments are described with reference to restricted drawings, embodiments may be variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of advantages of the electronic device and the control method thereof according to an embodiment of the present disclosure.

According to at least one of embodiments of the present disclosure, the electronic device may identify a first main path generated at a time point prior to a time point when a target map including a predetermined area with respect to a position of a robot and a point group including points set on the target map are received and obtained by connecting the set points with each other, based on receiving the target map and the point group, thus obtaining an effective result with low resource consumption by use of identification of a similar path for a path planning request.

Furthermore, according to at least one of embodiments of the present disclosure, the electronic device may apply a sub-map to at least one path planning model trained to calculate an optimal path on a map to obtain a sub-path of the sub-map, based on that a type of the sub-map is determined, thus improving the performance of path planning.

Furthermore, according to at least one of embodiments of the present disclosure, the electronic device may inspect whether transit points are included in the target map and whether each of the transit points is a point at which the robot is able to move, thus preventing an error due to an input error or mistake of the user and ensuring safety.

In addition, various effects ascertained directly or indirectly through the present disclosure may be provided.

Therefore, other implements, other embodiments, and equivalents to claims can be within the scope of the following claims.

Therefore, example embodiments of the present disclosure are not intended to limit the technical spirit of the present disclosure, but provided only for the illustrative purposes. The scope of the present disclosure can be construed on the basis of the accompanying claims, and technical ideas within the scope equivalent to the claims can be included in the scope of the present disclosure.

What is claimed is:

1. An electronic device, comprising:
one or more processors; and
a storage medium storing computer-readable instructions that, when executed by the one or more processors, enable the one or more processors to:
based on a target map including a target map area corresponding to a position of a robot received from the robot at a second time point, and based on a point group including points set on the target map received from the robot at the second time point, identify a first main path generated at a first time point prior to the second time point by connecting the points with each other,
in response to the first main path not being identified, determine a type of a first sub-map and a second sub-map obtained by segmenting the target map based on the points included in the point group,
in response to a type of the first sub-map and the second sub-map being determined, apply each of the first sub-map and the second sub-map to a path planning model trained to calculate an optimal path on a given sub-map to obtain a first sub-path of the first sub-map and a second sub-path of the second sub-map, and
connect the first sub-path and the second sub-path to generate a second main path in which the points are connected with each other.

2. The electronic device of claim 1, wherein the instructions further enable the one or more processors to:
identify a starting point, a destination, and a transit point included in the first main path, based on the first main path being identified; and transmit the first main path to the robot, based on a difference between each of the starting point, the destination, and the transit point and each of corresponding points included in the point group, respectively, being less than a threshold error distance.

3. The electronic device of claim 1, wherein the instructions further enable the one or more processors to:
identify transit points among the points included in the point group;
determine whether each of the transit points is a passable point at which the robot is able to move, based on the transit points being included in the target map; and
segment the target map using the points included in the point group, based on each of the transit points being the point at which the robot is able to move.

4. The electronic device of claim 3, wherein the instructions further enable the one or more processors to:
obtain a first transit point included in the transit points;
obtain a second transit point different from the first transit point among points spaced apart from the first transit point at a first distance; and
segment the target map using the first transit point and the second transit point to obtain the first sub-map and the second sub-map.

5. The electronic device of claim 4, wherein the instructions further enable the one or more processors to:
identify a center point of the first sub-map and a boundary point with a highest distance from the center point among surrounding points spaced apart from the center point on the first sub-map;
determine a sub-area including the surrounding points spaced apart from the center point; and
determine the first sub-map as the sub-area.

6. The electronic device of claim 1, wherein the instructions further enable the one or more processors to:
identify a preset map from a database storing the first main path; and
perform a type matching between the first sub-map and the preset map for the determining of the type of the first sub-map.

7. The electronic device of claim 6, wherein the instructions further enable the one or more processors to:
adjusting the first sub-map and the preset map to a first size;
identify a first pixel of the first sub-map and a second pixel on the preset map located at a same position as the first pixel; and
perform the type matching, based on a difference between the first pixel and the second pixel.

8. The electronic device of claim 7, wherein the instructions further enable the one or more processors to:
determine a similarity between the first sub-map and the preset map, based on the performing of the type matching; and
determine the type of the first sub-map as a preset type of the preset map, based on the similarity being greater than a similarity threshold.

9. The electronic device of claim 8, wherein the instructions further enable the one or more processors to:
generate the type of the first sub-map, based on the similarity being not greater than the determined similarity; and
store the type of the first sub-map in the database.

10. The electronic device of claim 1, wherein the instructions further enable the one or more processors to identify a first unit path planning model and a second unit path planning model in the path planning model, based on the path planning model including one or more unit path planning models.

11. The electronic device of claim 10, wherein the instructions further enable the one or more processors to:
apply the first sub-map to the first unit path planning model to obtain a 1_1st sub-path;
apply the first sub-map to the second unit path planning model to obtain a 1_2nd sub-path;
apply the second sub-map to the first unit path planning model to obtain a 2_1st sub-path; and
apply the second sub-map to the second unit path planning model to obtain a 2_2nd sub-path.

12. The electronic device of claim 11, wherein the instructions further enable the one or more processors to:
obtain a first required time value, including a first time interval between a third time point when the first sub-map is applied to the first unit path planning model and a fourth time point when the 1_1st sub-path is obtained;
obtain a first cost value, based on usage of the one or more processors and usage of the storage medium, according to the first required time value;
obtain a second required time value, including a second time interval between a fifth time point when the first sub-map is applied to the second unit path planning model and a sixth time point when the 1_2nd sub-path is obtained; and
obtain a second cost value, based on usage of the one or more processors and usage of the storage medium, according to the second required time value.

13. The electronic device of claim 12, wherein the instructions further enable the one or more processors to:
apply a weight group to each of the first required time value, the first cost value, and a first length of the first sub-path to determine a first score;
apply the weight group to each of the second required time value, the second cost value, and a second length of the second sub-path to determine a second score; and
obtain the first sub-path, based on comparing the first score with the second score.

14. The electronic device of claim 11, wherein the one or more processors includes a first processor, a second processor, and a target processor,
wherein the first processor is configured to apply the first sub-map to the first unit path planning model to obtain the 1_1st sub-path,
wherein the second processor is configured to apply the first sub-map to the second unit path planning model to obtain a 1_2nd sub-path, and
wherein the target processor is configured to asynchronously perform a first operation of the first processor and a second operation of the second processor.

15. The electronic device of claim 10, wherein the instructions further enable the one or more processors to:
provide a user who uses the robot with data about the first unit path planning model and the second unit path planning model; and
apply the first sub-map and the second sub-map to a selected unit path planning model selected by the user, based on receiving the selection of the selected unit path planning model from the user and wherein the selected unit path planning model includes one of the first unit path planning model or the second unit path planning model.

16. A control method, comprising:
- identifying a first main path generated at a time point prior to a time point after a target map including a predetermined area with respect to a position of a robot and a point group including points set on the target map are received and obtained by connecting the set points with each other;
- determining a type of at least one of a first sub-map or a second sub-map obtained by segmenting the target map on a basis of the points included in the point group, based on the first main path being not identified;
- applying the first sub-map and the second sub-map to a path planning model trained to calculate an optimal path on a map to obtain a first sub-path of the first sub-map and a second sub-path of the second sub-map, based on at least one of the type of the first sub-map or the type of the second sub-map being determined; and
- connecting the first sub-path and the second sub-path to generate a second main path in which the set points are connected with each other.

17. The control method of claim 16, wherein identifying the first main path comprises:
- identifying a starting point, a destination, and a transit point included in the first main path, based on the first main path being identified; and
- transmitting the first main path to the robot, based on a difference between each of the starting point, the destination, and the transit point and each of the points included in the point group being included in a predetermined error distance.

18. The control method of claim 16, further comprising:
- identifying transit points among the points included in the point group;
- determining whether each of the transit points is a point at which the robot is able to move, based on the transit points are included in the target map; and
- segmenting the target map on the basis of the points included in the point group, based on each of the transit points being the point at which the robot is able to move.

19. The control method of claim 16, wherein determining the type of the at least one of the first sub-map or the second sub-map comprises:
- identifying a preset map for determining a type of at least one sub-map between the first sub-map and the second sub-map, from a database storing the first main path; and
- performing type matching between the sub-map and the preset map to determine the type of the sub-map.

20. The control method of claim 16, further comprising:
- identifying a first unit path planning model and a second unit path planning model in the path planning model, based on the path planning model including one or more unit path planning models;
- providing a user who uses the robot with data about the first unit path planning model and the second unit path planning model; and
- applying the first sub-map and the second sub-map to a unit path planning model selected by the user, based on receiving a selection of at least one of the first unit path planning model or the second unit path planning model from the user.

* * * * *